(12) United States Patent  (10) Patent No.: US 7,897,892 B2
Mori et al.  (45) Date of Patent: Mar. 1, 2011

(54) METHOD OF BONDING AN OPTICAL COMPONENT

(75) Inventors: Masahiro Mori, Osaka (JP); Izuru Nakai, Osaka (JP); Toshiharu Kimura, Kumamoto (JP); Takeshi Fujishima, Kumamoto (JP)

(73) Assignee: Panasonic Corporation, Osaka (JP)

( * ) Notice: Subject to any disclaimer, the term of this patent is extended or adjusted under 35 U.S.C. 154(b) by 1161 days.

(21) Appl. No.: 11/586,644

(22) Filed: Oct. 26, 2006

(65) Prior Publication Data

US 2007/0095806 A1 May 3, 2007

(30) Foreign Application Priority Data

Oct. 28, 2005 (JP) .............................. 2005-313600

(51) Int. Cl.
*H01L 21/00* (2006.01)
*G11B 7/00* (2006.01)
*B23K 26/20* (2006.01)

(52) U.S. Cl. ............................... 219/121.66; 369/44.14; 438/22

(58) Field of Classification Search ............ 219/121.65, 219/121.66, 121.85; 228/189, 248.5; 369/44.14
See application file for complete search history.

(56) References Cited

U.S. PATENT DOCUMENTS

| 2,024,065 | A | * | 12/1935 | Schellens | 220/592.27 |
| 2,460,668 | A | * | 2/1949 | Wurzburger | 285/21.1 |
| 4,251,709 | A | * | 2/1981 | Schumacher | 219/121.14 |
| 4,891,544 | A | * | 1/1990 | Capek et al. | 313/402 |
| 5,559,918 | A | * | 9/1996 | Furuyama et al. | 385/92 |
| 6,212,852 | B1 | * | 4/2001 | Tsai | 52/786.13 |
| 6,581,438 | B1 | * | 6/2003 | Hall et al. | 73/53.01 |
| 7,287,312 | B2 | * | 10/2007 | Yamaguchi | 29/603.04 |
| 2004/0134976 | A1 | * | 7/2004 | Keyser et al. | 228/248.1 |

FOREIGN PATENT DOCUMENTS

| JP | 06-039583 | 2/1994 |
| JP | 08-036771 | 2/1996 |
| JP | 11-110777 | 4/1999 |
| JP | 2005-166157 | 6/2005 |

* cited by examiner

*Primary Examiner*—Samuel M Heinrich
(74) *Attorney, Agent, or Firm*—Steptoe & Johnson LLP

(57) ABSTRACT

A light source (2) and a connection base (1) are held with a predetermined gap, solder paste melted by the thermal energy of laser light is fed into the gap, and the light source (2) and the connection base (1) are bonded together via a solder layer (32).

4 Claims, 6 Drawing Sheets

METHOD OF BONDING AN OPTICAL COMPONENT

FIELD OF THE INVENTION

The present invention relates to an optical component bonding method and an optical pickup including a light source and a connection base which are bonded by the bonding method in which the light source and the connection base for holding the light source are bonded together during the production of the optical pickup used for an optical disc apparatus.

BACKGROUND OF THE INVENTION

In recent years, optical disc apparatuses for recording and reproduction on optical discs such as a DVD have become widespread. In the production of an optical pickup used for such an optical disc apparatus, precise bonding is necessary between a light source and a connection base for holding the light source. The following will describe a conventional bonding method.

FIG. 5A is a perspective view showing a connection base for holding a light source for an optical pickup. FIG. 5B is a perspective view showing the light source for an optical pickup. As shown in FIGS. 5A and 5B, a connection base 1 includes joints 11 and 12 which are bonded to a light source 2, and the light source 2 includes side portions 21 and 22 which are bonded to the connection base 1. The connection base 1 and the light source 2 are bonded together as follows: the components are adjusted to predetermined positions, a solder material is supplied onto the joints 11 and 12 of the connection base 1 and irradiated with laser light, and the joints 11 and 12 and the side portions 21 and 22 are soldered.

FIG. 6A is a front view showing a state after the connection base and the light source are bonded together by the conventional bonding method. FIG. 6B is a bottom plan view showing the state after the connection base and the light source are bonded together by the conventional bonding method. Conventionally, as shown in FIGS. 6A and 6B, solder 3 is set in contact with the outer edges of the light source 2 and the solder 3 is set on corners formed by the joints 11 and 12 of the connection base 1 and the side portions 21 and 22 of the light source 2 (For example, see Japanese Patent Laid-Open No. 2005-166157).

However, the conventional bonding method has the following problem: heat is applied to melt the solder material and bond the light source and the connection base, and at this point, the heat is also applied to the light source and the connection base, so that members making up the light source and the connection base thermally expand. In this case, the direction of thermal expansion varies among the members making up the light source and the connection base because the material, the shape, the holding method and so on are different among the members. Thus the relative position between the light source and the connection base is shifted. Since die casting is used for the connection base, internal residual stress is released when heat is applied by solder bonding, so that the relative position between the light source and the connection base is shifted. When a bonding interface between the light source and the connection base has a large friction force during the shift of the relative position, a return position at a temperature decrease after soldering greatly varies.

As described above, the conventional bonding method causes a wide range of variations in the relative position between the light source and the connection base, so that the characteristics of a product cannot be ensured.

DISCLOSURE OF THE INVENTION

An object of the present invention is to provide a method of bonding an optical component whereby variations in the change of the relative position between a light source and a connection base are reduced and the accuracy of position after bonding is stabilized, so that the characteristics of a product can be ensured, and provide an optical pickup including the light source and the bonding base which are bonded together by the bonding method.

In order to attain the object, the method of bonding an optical component according to the present invention includes: holding, with a predetermined gap, a light source and a connection base for holding the light source, supplying a solder material onto a position near the gap, melting the solder material by thermal energy of laser light so that the molten solder material flow into the gap, and bonding the light source and the connection base.

According to the bonding method of the present invention, the solder material includes a member having a higher melting point than the solder material.

The bonding method of the present invention further includes: irradiating the connection base with laser light before the solder material is supplied in the method of bonding an optical component.

According to the bonding method of the present invention, the gap is 5 μm to 100 μm in the method of bonding an optical component.

According to the bonding method of the present invention, the solder material is low-temperature solder in the method of bonding an optical component.

An optical pickup of the present invention includes a light source, a connection base for holding the light source, and a solder layer formed between the light source and the connection base, wherein the light source and the connection base are bonded together via the solder layer.

According to the optical pickup of the present invention, the solder layer is mixed with a member having a higher melting point than a solder material in the optical pickup.

According to the optical pickup of the present invention, the solder layer is 5 μm to 100 μm in thickness in the optical pickup.

According to the present invention, the light source and the connection base are bonded together via the solder layer having a predetermined height. It is thus possible to reduce friction force on a bonding interface between the connection base and the light source during heating of solder bonding, reduce variations in the change of the relative position between the light source and the connection base, and achieve bonding with the accuracy of position on the order of several micrometers, thereby ensuring the product characteristics.

DESCRIPTION OF THE EMBODIMENTS

Embodiment 1

Figure 1:
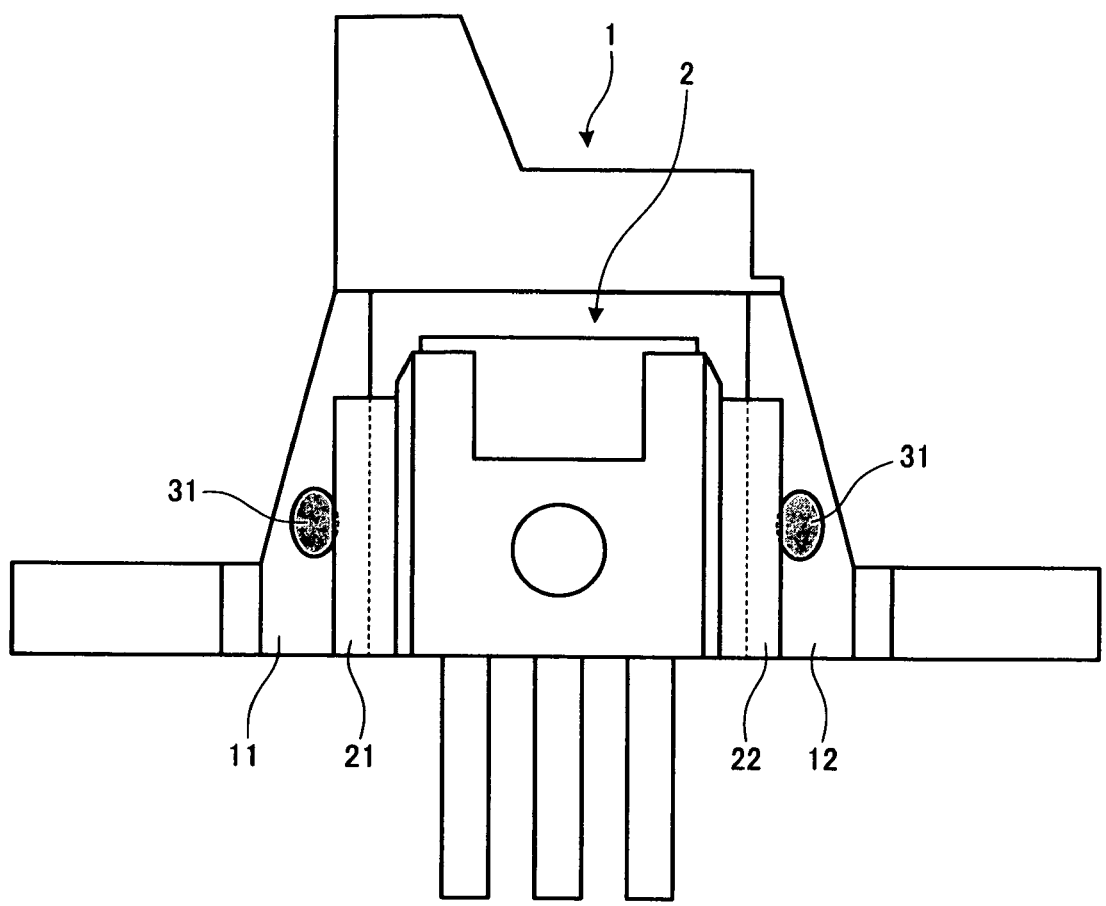
FIG. 1 is a schematic drawing (front) showing that a connection base and a light source are bonded together according to Embodiment 1 of the present invention.

FIG. 1 is a front view showing a connection base and a light source during laser radiation according to Embodiment 1 of the present invention. In this embodiment, a connection base 1 is a square of about 10.0 mm×10.0 mm and a light source 2 is a square of about 5.0 mm×5.0 mm. As a matter of course, the sizes are not particularly limited.

The connection base 1 for holding the light source 2 for an optical pickup includes joints 11 and 12 which are bonded to side portions 21 and 22 provided on the light source 2. The surfaces of the joints 11 and 12 on the sides of the side portions 21 and 22 and the surfaces of the side portions 21 and 22 on the sides of the joints 11 and 12 are preferably made of a metallic material selected from the group consisting of zinc (Zn), tin (Sn), copper (Cu), silver (Ag), gold (Au), nickel (Ni), aluminum (Al), titanium (Ti) and an alloy thereof.

When the light source 2 is soldered to the connection base 1, the relative position between the connection base 1 and the light source 2 is first determined such that a proper amount of light is emitted from the light source 2 and the optical axis of the light is properly positioned while a 30.0-μm spacing is kept between the side portions 21 and 22 and the joints 11 and 12.

After the positions of the connection base 1 and the light source 2 are determined, on the surfaces of the joints 11 and 12 on the sides of the side portions 21 and 22, about 0.5 mg of solder paste (cream solder) 31 which is a solder material is applied to each point around areas where the side portions 21 and 22 are projected. The solder material is preferably low-temperature solder such as Sn—Bi eutectic alloy.

After the solder paste 31 is applied, in order to melt the applied solder paste 31, a spot of laser light shaped like a square of about 1.0 mm×2.0 mm is projected to an area around the point where the solder paste 31 has been applied. The laser light initially has a power of 4 W and is emitted for four seconds. And then, the power of the laser light is increased to 8 W and the laser light is emitted for seven seconds. Although the laser light for melting the solder paste 31 may be directly emitted to the solder paste 31, it is desirable that the laser light be emitted to the connection base 1 and the solder paste 31 be melted by the heat of the laser light.

Figure 2:
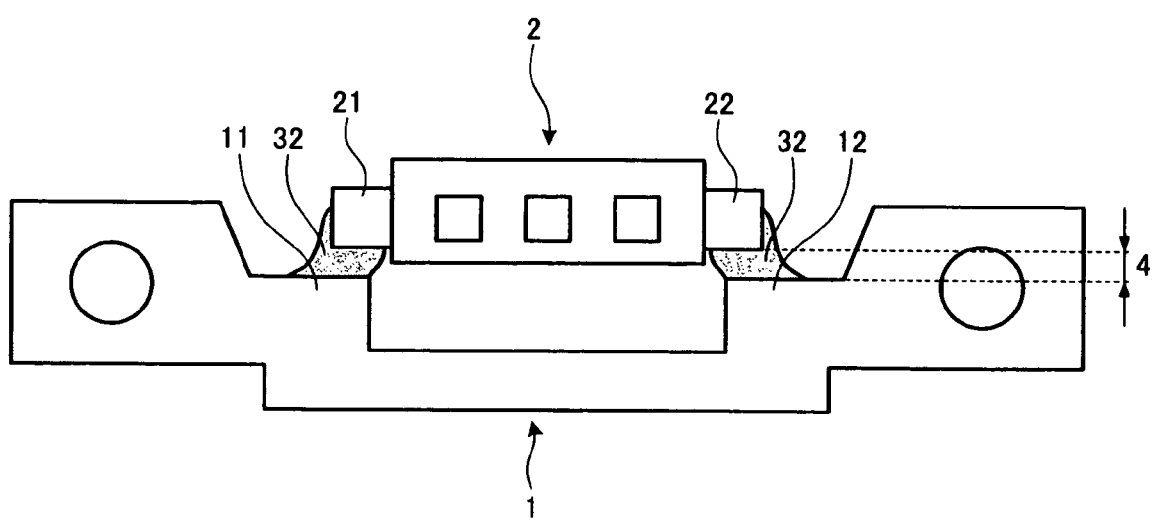
FIG. 2 is a schematic drawing (bottom) showing a state after the connection base and the light source are bonded together according to Embodiment 1 of the present invention.

FIG. 2 is a bottom plan view showing a state after the connection base and the light source are bonded together according to Embodiment 1. The solder paste melted by the thermal energy of the laser light flows to gaps between the joints 11 and 12 and the side portions 21 and 22. After the irradiation of the laser light is stopped, the solder paste is hardened (set), so that the connection base 1 and the light source 2 are bonded together via a solder layer 32 having a height (thickness) of about 30.0 μm.

In the above explanation, a gap 4 (the height of the solder layer 32) is about 30 μm. As a matter of course, the size of the gap 4 is not particularly limited. When the connection base 1 is a square of about 10.0 mm×10.0 mm and the light source 2 is a square of about 5.0 mm×5.0 mm, the gap 4 is desirably set at 5 μm to 100 μm.

Figure 3:
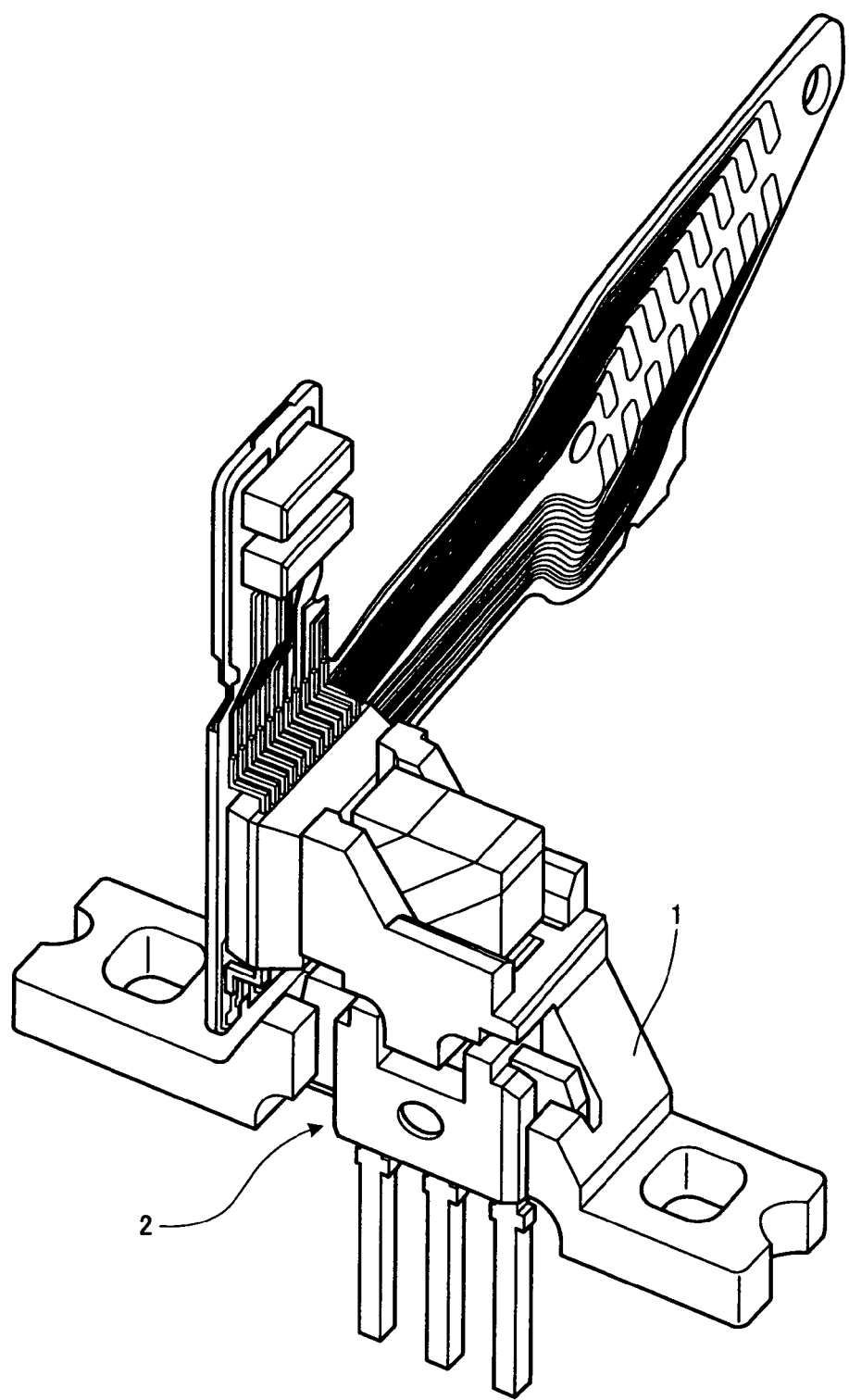
FIG. 3 is a perspective view showing the appearance of an optical pickup according to Embodiment 1 of the present invention.

With this method, it is possible to produce an optical pickup including the light source 2, the connection base 1 for holding the light source 2, and the solder layer 32 formed between the light source 2 and the connection base 1. The light source 2 and the connection base 1 are bonded together via the solder layer 32. FIG. 3 shows an example of the appearance of the optical pickup produced thus.

As described above, the connection base and the light source are bonded together via the solder layer having the predetermined height, thereby reducing friction force on a bonding interface between the connection base and the light source during heating (laser radiation) of solder bonding. Thus interaction caused by thermal expansion during laser radiation is reduced and a relative displacement is reduced between the light source and the connection base during the setting of the solder, so that the product characteristics are further stabilized. Moreover, the molten solder material is apt to enter the bonding interface due to a capillary action, preventing poor solder bonding. Moreover, the flow of the molten solder material into the gap increases a bonding area and a thermal capacity, preventing at least one of degradation in the characteristics of the light source and a short life of the light source. The degradation and the short life are caused by heat.

Embodiment 2

Figure 4:
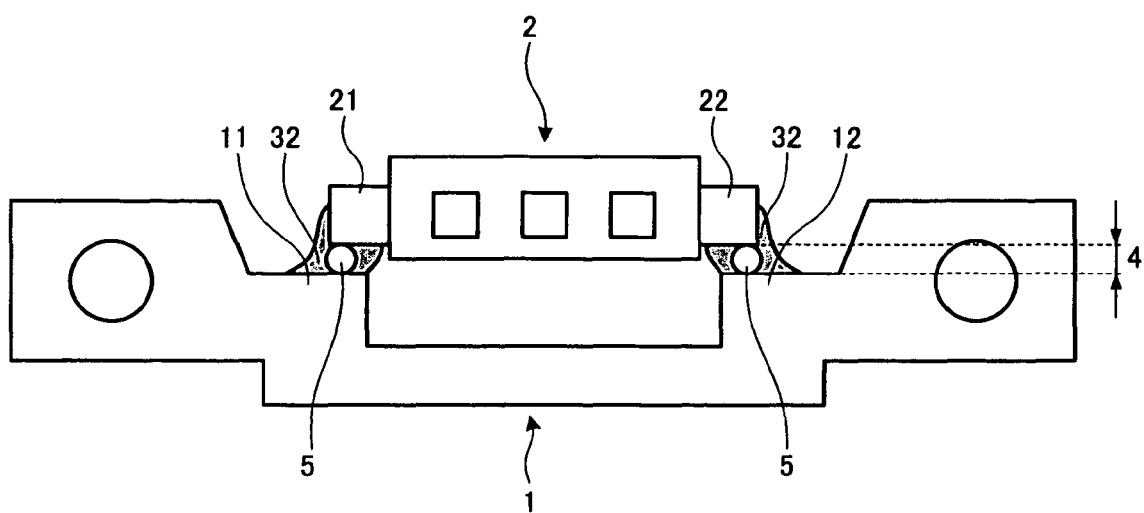
FIG. 4 is a schematic drawing (bottom) showing a state after a connection base and a light source are bonded together according to Embodiment 2 of the present invention.
Figure 5A:
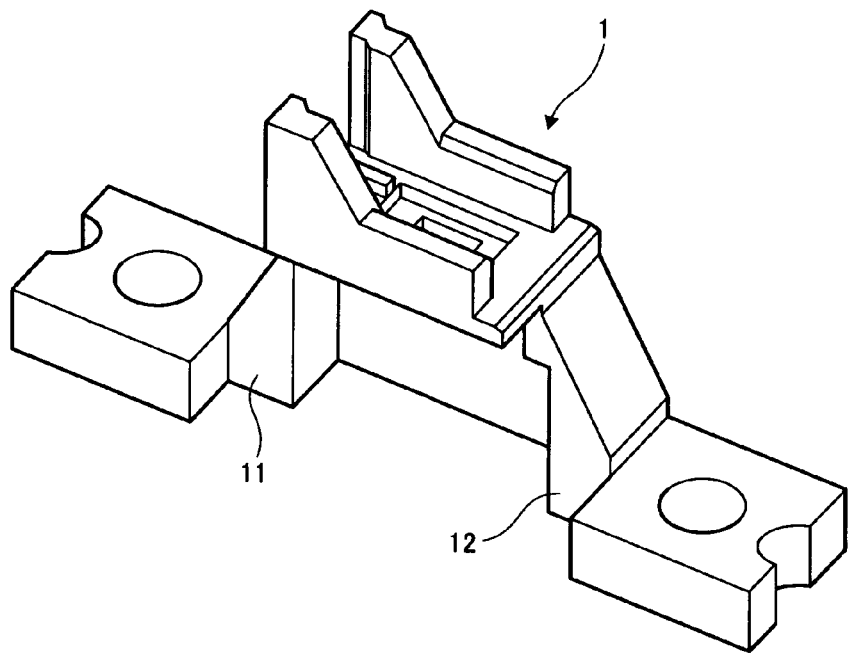
FIG. 5A is a schematic drawing showing a connection base.
Figure 5B:
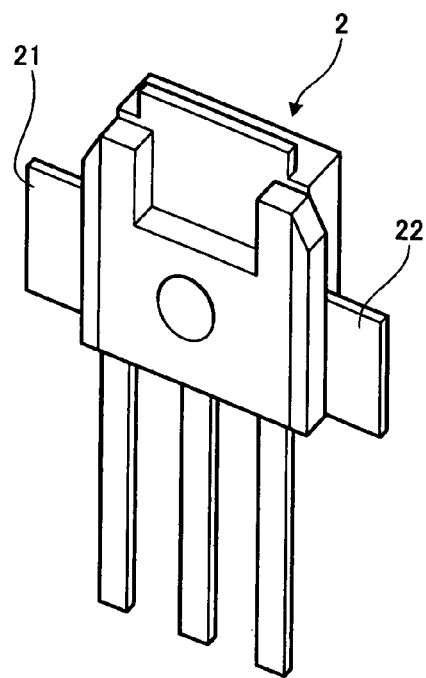
FIG. 5B is a schematic drawing showing a light source.
Figure 6A:
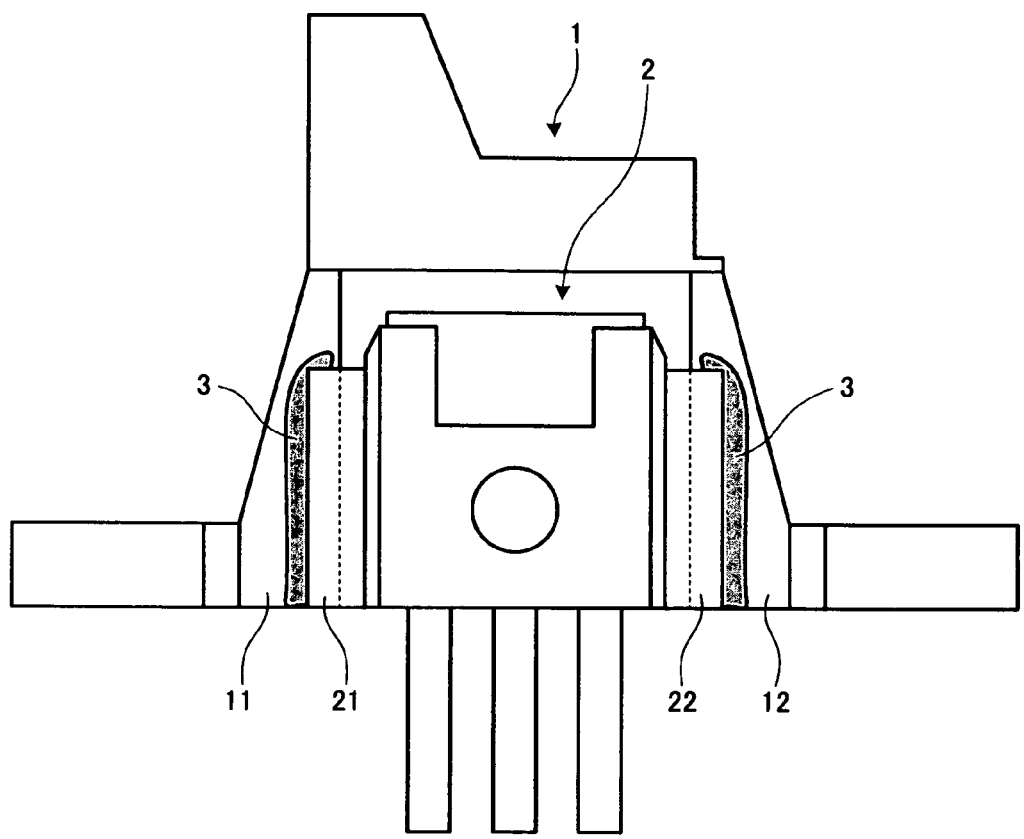
FIG. 6A is a schematic drawing (front) showing a state after the connection base and the light source are bonded together according to a conventional bonding method.
Figure 6B:
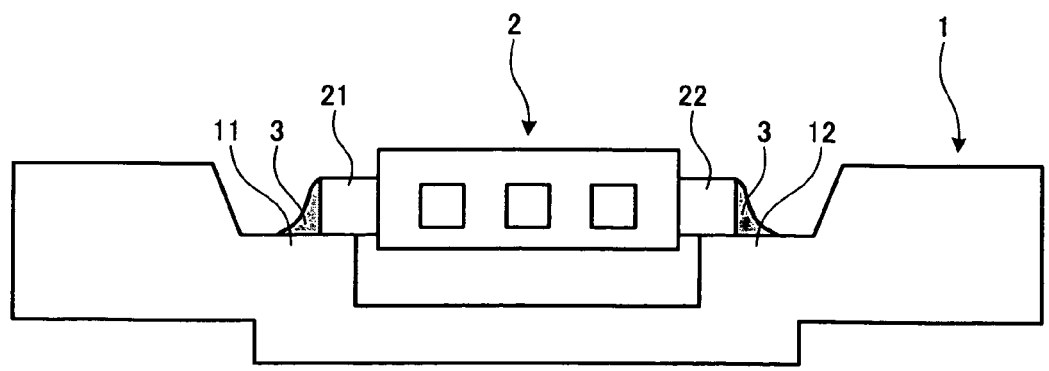
FIG. 6B is a schematic drawing (bottom) showing a state after the connection base and the light source are bonded together according to the conventional bonding method.

FIG. 4 is a bottom plan view showing a state after a connection base and a light source are bonded together according to Embodiment 2 of the present invention. The same members as those of Embodiment 1 are indicated by the same reference numerals and the explanation thereof is omitted. Regarding the irradiation position of laser light and the supply position of solder paste when a connection base 1 and a light source 2 are bonded together, Embodiment 2 is similar to Embodiment 1. Thus the supply position of solder paste and their radiation position of laser light will be discussed below with reference to FIG. 1.

When the light source 2 is soldered to the connection base 1, as in Embodiment 1, the relative position between the connection base 1 and the light source 2 is determined such that a proper amount of light is emitted from the light source 2 and the optical axis of the light is properly positioned while a 30.0-μm spacing is kept between side portions 21 and 22 and joints 11 and 12. After the positions of the members are determined, on the surfaces of the joints 11 and 12 on the sides of the side portions 21 and 22, about 0.5 mg of solder paste (cream solder) 31 which is a solder material is applied to each point around areas where the side portions 21 and 22 are projected.

In Embodiment 2, spherical members 5 having a higher melting point than a solder material are mixed in the solder paste 31. The ratio of the member 5 is 5 vol % to 40 vol %. The shape of the member is not limited to a sphere. It is preferable that the members are uniform in size and capable of keeping an equal spacing between two parallel planes when the members are interposed between the planes. In this case, a gap between the light source 2 and the connection base 1 is 30.0 μm and thus spherical members measuring about 30.0 μm in diameter are used.

After the solder paste 31 is applied, in order to melt the applied solder paste 31, a spot of laser light shaped like a square of about 1.0 mm×2.0 mm is projected to an area around a point where the solder paste 31 has been applied, so that the solder paste 31 mixed with the spherical member 5 is melted. The laser light initially has a power of 4 W and is emitted for four seconds as in Embodiment 1. And then, the power of the laser light is increased to 8 W and the laser light is emitted for seven seconds. Although the laser light may be directly emitted to the solder paste 31, it is desirable that the laser light be emitted to the connection base 1 and the solder paste 31 be melted by the heat of the laser light.

The solder paste melted by the thermal energy of the laser light flows, together with the spherical members 5, to gaps between the joints 11 and 12 and the side portions 21 and 22. After the irradiation of the laser light is stopped, the solder paste is hardened (set) in a state in which the spherical members 5 are placed in the gaps, so that the connection base 1 and the light source 2 are bonded together via a solder layer 32 having a height (thickness) of about 30.0 μm.

In the above explanation, a gap 4 (the height of the solder layer 32) is about 30 μm. As a matter of course, the size of the gap 4 is not particularly limited. When the connection base 1 is a square of about 10.0 mm×10.0 mm and the light source 2 is a square of about 5.0 mm×5.0 mm, the gap 4 is desirably set at 5 μm to 100 μm. Thus the size of the member mixed in the solder material is set so as to keep the gap 4 at 5 μm to 100 μm.

With this method, it is possible to produce an optical pickup including the light source 2, the connection base 1 for holding the light source 2, the solder layer 32 formed between the light source 2 and the connection base 1, and the members 5 which are mixed in the solder layer 32 and have a higher melting point than the solder material. The light source 2 and the connection base 1 are bonded together via the solder layer 32, in which the members 5 for keeping the gap between the light source 2 and the connection base 1 are mixed. An example of the appearance of the optical pickup produced thus is similar to FIG. 3.

As described above, according to Embodiment 2, the spherical members 5 having a higher melting point than the solder material are mixed in the solder paste 31, so that the spherical members 5 act as spacers and accurately keep the gap 4.

Embodiment 3

Embodiment 3 will be described below with reference to FIG. 1. The same members as those of Embodiment 1 are indicated by the same reference numerals and the explanation thereof is omitted. Regarding the irradiation position of laser light and the supply position of solder paste when a connection base 1 and a light source 2 are bonded together, Embodiment 3 is similar to Embodiment 1. Embodiment 3 is different from Embodiment 1 in that the connection base 1 is irradiated with laser light before solder is supplied. The solder is supplied after thermal hysteresis is given.

When the light source 2 is soldered to the connection base 1, as in Embodiment 1, the relative position between the connection base 1 and the light source 2 is determined such that a proper amount of light is emitted from the light source 2 and the optical axis of the light is properly positioned while a 30.0-μm spacing is kept between side portions 21 and 22 and joints 11 and 12.

Thereafter, laser light is emitted to a position where solder paste 31 is supplied on the connection base 1. The laser light initially has a power of 4 W and is emitted for four seconds. And then, the power of the laser light is increased to 8 W and the laser light is emitted for seven seconds. The advance laser radiation increases the temperature of the connection base 1 to the transition temperature of the used material or higher. The laser radiation is not limited to this method. Any method may be used as long as the temperature of the connection base 1 can be increased to the transition temperature or higher. At least one time of laser radiation is necessary.

Thereafter, on the surfaces of the joints 11 and 12 on the sides of the side portions 21 and 22, about 0.5 mg of the solder paste (cream solder) 31 which is a solder material is applied to each point around areas where the side portions 21 and 22 are projected. And then, a spot of laser light shaped like a square of about 1.0 mm×2.0 mm is projected to an area around the point where the solder paste 31 is applied, so that the solder paste 31 is melted. The laser light initially has a power of 4 W and is emitted for four seconds as in Embodiment 1. And then, the power of the laser light is increased to 8 W and the laser light is emitted for seven seconds.

In Embodiment 3, after the relative position between the connection base 1 and the light source 2 is determined, laser light is emitted before the solder paste 31 is applied. The laser light may be emitted before the relative position between the connection base 1 and the light source 2 is determined.

As described above, according to Embodiment 3, laser light is emitted in advance before solder is supplied, so that it is possible to eliminate internal distortion of the connection base and reduce variations in thermal expansion amount during soldering and deformation caused by thermal expansion. Thus displacements before and after bonding can be reduced. It is therefore possible to achieve bonding with the accuracy of position on the order of several micrometers, thereby ensuring the product characteristics.

With the method of bonding an optical component according to the present invention, variations in the change of the relative position between the light source for an optical pickup and the connection base are reduced and the accuracy of position after bonding is stabilized, so that the product characteristics can be ensured. Thus the present invention is useful for manufacturing a product for which precise bonding is necessary. Further, the optical pickup of the present invention achieves highly precise bonding between the light source and the connection base, and thus the present invention is useful for an optical disc apparatus including an optical pickup.

What is claimed is:

1. A method of bonding an optical component, comprising:
   holding a light source and a connection base for holding the light source, with a predetermined gap between the base and light source,
   irradiating the connection base with laser light thereby heating the connection base before supplying a solder material to a position near the gap,
   melting the solder material by thermal energy of laser light, and permitting the molten solder material to flow into the gap, and
   bonding the light source and the connection base.

2. The method of bonding an optical component according to claim 1, wherein the solder material includes particles having a higher melting point than the solder material.

3. The method of bonding an optical component according to claim 1, wherein the gap is 5 μm to 100 μm in width.

4. The method of bonding an optical component according to claim 1, wherein the solder material is low-temperature solder.

* * * * *